A. HANCE.
Fender for Car-Platforms.
No. 207,736. Patented Sept. 3, 1878.
Fig. 1.
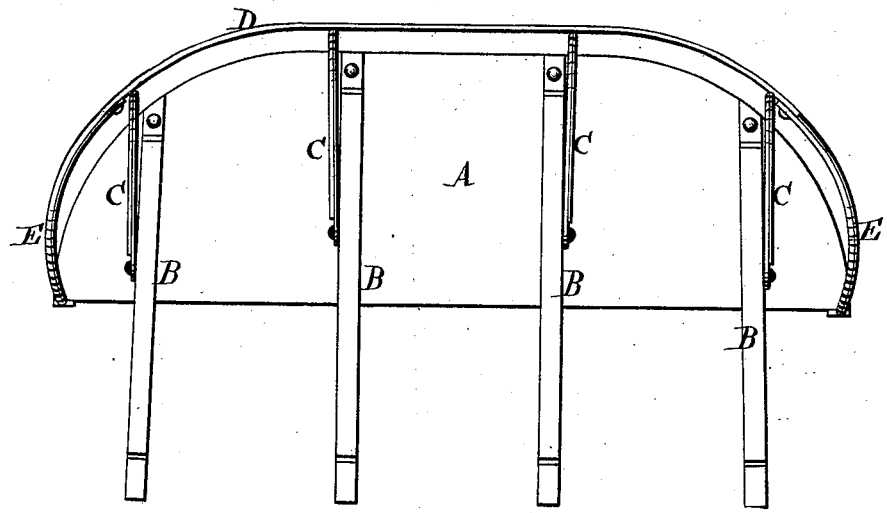
Fig. 2. Fig. 3.
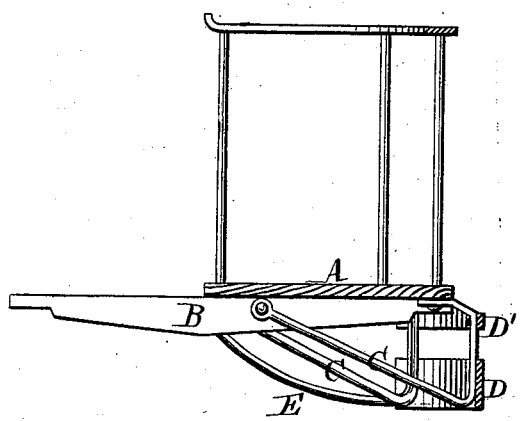 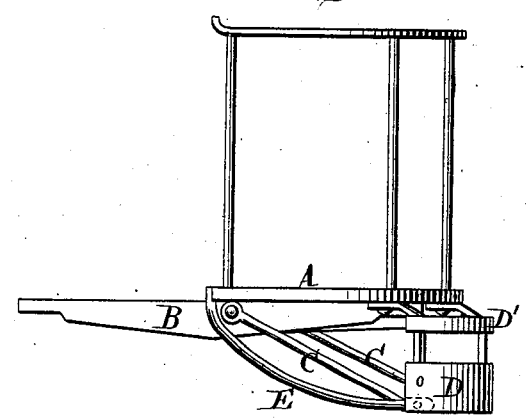
Witnesses.
Chas. Wahlers,
W. C. Hauff.
Inventor.
Archibald Hance
by his attys.
Van Santvoord & Hauff

UNITED STATES PATENT OFFICE.

ARCHIBALD HANCE, OF NEW YORK, N. Y.

IMPROVEMENT IN FENDERS FOR CAR-PLATFORMS.

Specification forming part of Letters Patent No. 207,736, dated September 3, 1878; application filed August 1, 1878.

*To all whom it may concern:*

Be it known that I, ARCHIBALD HANCE, of the city, county, and State of New York, have invented a new and useful Improvement in Car-Platforms, which improvement is fully set forth in the following specification, reference being had to the accompanying drawing, in which—

Figure 1 represents an inverted plan view of a platform containing my invention. Fig. 2 is a longitudinal section thereof. Fig. 3 is a side view of the same.

Similar letters indicate corresponding parts.

In horse-cars, and especially those drawn by one horse, the front platform is usually constructed with a fender, mainly to obviate the liability of catching the horse beneath the car in case he stops or falls while the car is in motion. The aim of my invention is primarily to produce a fender which is less cumbersome than those now generally in use, and which at the same time possesses the requisite strength, a secondary object being to prevent the driver or others from falling under the car in getting on or off the platform.

The invention consists in the combination, with the front platform of a car, of bracket-arms arranged longitudinally of the car, and having their front ends projecting upwardly and secured to the under side of the platform, to which vertically-projecting parts of the bracket-arms are attached a slat or slats, which extend in a horizontal position around the front end of the car-platform, as will be more fully hereinafter set forth.

In the drawing, the letter A designates the platform of a railroad-car, supported on timbers B running lengthwise of the car. To each of the timbers B, I secure one end of a bracket-arm, C, the other end of which is secured to the bottom of the platform A, in such a manner that the arms extend longitudinally of the car.

If desired, the arms C may be secured to the timbers B, or to the platform at both ends, instead of being arranged as stated.

The arms C are bent in such a way that a portion thereof runs vertically, and to this part of the arms I secure two (more or less) slats, D D', so that these slats extend in a horizontal direction, the same being, in the example shown, curved to correspond to the shape of the front edge of the platform, as seen in Fig. 1, and the arms C being set accordingly.

To each end of the lower slat, D, I secure one end of a guard-rail, E, which is curved upwardly, and the other end of which is secured to the side of the platform A.

It will be readily perceived that the horizontal slats D, in connection with the bracket-arms C, form an effective fender against the admission of any object beneath the front part of the platform, while the guard-rails E have a like effect as to the sides or end parts thereof, the whole, moreover, having a light and graceful appearance and possessing sufficient strength for all purposes.

It may be remarked that my invention is applicable to other vehicles beside horse-cars.

What I claim as new, and desire to secure by Letters Patent, is—

In combination with the platform A of a street car and the supporting-timbers B of the same, the bracket-arms C, attached at their rear ends to said timbers, and having their front ends bent up vertically and secured to the under side of the platform, the slat or slats D, and the brace-rods E, all constructed and arranged substantially as and for the purposes specified.

In testimony that I claim the foregoing I hereunto set my hand and seal this 25th day of July, 1878.

A. HANCE. [L. S.]

Witnesses:
W. HAUFF,
E. F. KASTENHUBER.